(12) United States Patent
Gonzalez Uribe et al.

(10) Patent No.: US 10,202,053 B2
(45) Date of Patent: Feb. 12, 2019

(54) VEHICLE SEAT

(71) Applicant: TOYOTA JIDOSHA KABUSHIKI KAISHA, Aichi (JP)

(72) Inventors: Carlos David Gonzalez Uribe, Susono (JP); Kohshi Katoh, Hadano (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 47 days.

(21) Appl. No.: 15/657,038

(22) Filed: Jul. 21, 2017

(65) Prior Publication Data

US 2018/0022238 A1 Jan. 25, 2018

(30) Foreign Application Priority Data

Jul. 25, 2016 (JP) .................................. 2016-145364

(51) Int. Cl.
| | |
|---|---|
| *B60N 2/39* | (2006.01) |
| *B60N 2/10* | (2006.01) |
| *F16C 11/10* | (2006.01) |
| *B60N 2/66* | (2006.01) |
| *B60N 2/68* | (2006.01) |
| *B60N 2/02* | (2006.01) |
| *F16C 11/06* | (2006.01) |

(52) U.S. Cl.
CPC ................. *B60N 2/10* (2013.01); *B60N 2/02* (2013.01); *B60N 2/39* (2013.01); *B60N 2/66* (2013.01); *B60N 2/68* (2013.01); *F16C 11/10* (2013.01); *B60N 2002/026* (2013.01); *B60N 2002/0208* (2013.01); *B60N 2002/0212* (2013.01); *F16C 11/06* (2013.01)

(58) Field of Classification Search
CPC .............. B60N 2/39; B60N 2002/0208; B60N 2002/0212; B60N 2002/022
See application file for complete search history.

(56) References Cited

U.S. PATENT DOCUMENTS

| | | | |
|---|---|---|---|
| 2008/0097254 A1* | 4/2008 | Torres .................... | A61G 5/045 601/23 |
| 2014/0191550 A1 | 7/2014 | Katoh et al. | |
| 2015/0239381 A1 | 8/2015 | Hamabe et al. | |
| 2015/0266448 A1* | 9/2015 | Aoki ....................... | B60R 22/20 297/313 |
| 2015/0343924 A1* | 12/2015 | Takeuchi .................. | B60N 2/39 297/314 |

(Continued)

FOREIGN PATENT DOCUMENTS

| | | | | |
|---|---|---|---|---|
| DE | 3715128 A1 * | 11/1988 | ............... | B60N 2/39 |
| EP | 2899063 A1 * | 7/2015 | ............. | B63B 29/12 |

(Continued)

*Primary Examiner* — Timothy J Brindley
(74) *Attorney, Agent, or Firm* — Hauptman Ham, LLP

(57) ABSTRACT

A vehicle seat in which a thickness of a seatback is reduced is provided. A supporting mechanism comprises a pivot shaft, a hub member, and a reinforcement shaft. A front end of a seat base frame is connected to a lower frame through a first joint in a pivotal manner. One end of a pivot shaft is connected to a rear end of the seat base frame in a pivotal manner, and other end of the pivot shaft is connected to a hub through a second joint in a pivotal manner. The pivot shaft and the reinforcement shaft are overlapped in a width direction of the vehicle at least partially.

13 Claims, 10 Drawing Sheets

(56) References Cited

U.S. PATENT DOCUMENTS

| | | | | |
|---|---|---|---|---|
| 2015/0352981 A1* | 12/2015 | Nagayasu | ............... | B60N 2/68 |
| | | | | 297/313 |
| 2016/0159254 A1 | 6/2016 | Katoh et al. | | |
| 2017/0203673 A1* | 7/2017 | Parker | ..................... | B60N 2/39 |
| 2018/0072187 A1* | 3/2018 | Katoh | .................... | B60N 2/028 |

FOREIGN PATENT DOCUMENTS

| | | | | |
|---|---|---|---|---|
| EP | 2957459 A1 * | 12/2015 | ............ | B60N 2/666 |
| EP | 2 965 955 A1 | 1/2016 | | |
| FR | 2887189 A1 * | 12/2006 | ............... | B60N 2/39 |
| JP | S60-085235 U1 | 6/1985 | | |
| JP | 2015-24680 A | 2/2015 | | |
| JP | 2015-160457 A | 9/2015 | | |
| JP | 2018043671 A * | 3/2018 | ............ | B60N 2/028 |
| WO | 2013-021497 A1 | 2/2013 | | |
| WO | 2015-011803 A1 | 1/2015 | | |

\* cited by examiner

VEHICLE SEAT

CROSS REFERENCE TO RELATED APPLICATIONS

The present application claims the benefit of priority to Japanese Patent Application No. 2016-145364 filed on Jul. 25, 2016 with the Japanese Patent Office, to which the man skilled in the art can refer to when reading the present application.

BACKGROUND

Field of the Disclosure

Embodiments of the present application relate to a vehicle seat in which a seat base is allowed to sway or pivot with respect to a pedestal frame during turning.

Discussion of the Related Art

Vehicle seats are required to hold an occupant stably in natural posture. However, a driver moves his/her body when turning a steering wheel, when moving a shift lever etc., and a passenger is swayed by a lateral load during turning. For example, PCT international publication WO 2015/011803 describes an example of a vehicle seat comfortably holding an occupant with a movement of the occupant while saving a manufacturing cost.

According to the teachings of WO 2015/011803, a sliding plate is slidably supported by a rear frame extending upwardly from a rear end of a lower frame while being inclined backwardly, and a backrest is attached to the sliding plate in a pivotal manner so that the backrest is allowed to pivot with a twisting motion of an upper body of the driver. The seat taught by WO 2015/011803 is provided with a seat supporting mechanism for supporting the pelvis periphery of the occupant in a pivotal manner during turning. The seat supporting mechanism includes a first supporter and a second supporter. The first supporter has a first ball joint supporting a front section of the seat while being allowed to pivot with respect to the lower frame. The second supporter also has a second ball joint fixed to the rear section of the rear frame, and an L-shaped suspension member whose upper end is coupled to the second ball joint and whose lower end is fixed to the rear section of the seat frame.

US 2015/0239381 A1 also describes a vehicle seat in which a net is attached to a seat backrest frame, and PCT international publication WO 2013/021497 describes another example of the vehicle seat in which the seat is supported in a pivotal manner around a shaft attached to the lower frame. In addition, JP-A-2015-024680 describes a vehicle seat having a restriction member for restricting a pivotal movement of the seat.

In the vehicle seat taught by WO 2015/011803, the L-shaped suspension member is suspended from an upper end of the rear frame. However, since the L-shaped suspension member is combined with the backwardly inclined rear frame, a thickness of the backrest has to be increased by a triangular space formed by the L-shaped suspension member and the rear frame. Thus, it is preferable to reduce the thickness of the seat taught by WO 2015/011803 to make use of a vehicle compartment.

SUMMARY

Aspects of the present application have been conceived noting the foregoing technical problems, and it is therefore an object of the present application is to provide a vehicle seat in which a longitudinal length thereof is reduced.

The present application relates to a vehicle seat, comprising: a lower frame that is disposed in a cabin of a vehicle; an upper frame connected to the lower frame on which a backrest is formed; a seat base frame disposed on the lower frame on which a seat base is formed; a supporting mechanism that supports the seat base frame in a pivotal manner; and a first joint that connects a front end portion of the seat base frame to the lower frame in a pivotal manner. In order to achieve the above-explained objective, according to the embodiments of the present application, the supporting mechanism comprises: a pivot shaft in which one of end portions thereof is connected to a rear end portion of the seat base frame; a hub member that is situated within the upper frame while being connected to the upper frame; a second joint that connects other end portion of the pivot shaft to the hub; and a reinforcement shaft in which one of end portions is connected to the hub member, and other end portion is connected to the upper frame or the lower frame. In addition, the pivot shaft and the reinforcement shaft are overlapped in a width direction of the vehicle at least partially.

In some embodiment, the vehicle seat may further comprise a restriction mechanism that restricts a pivotal motion of the seat base frame. The restriction mechanism may include a restriction member that selectively allows and restricts a pivotal motion of the pivot shaft from both sides of the pivot shaft. The restriction mechanism may further includes a rotating mechanism that rotates the restriction member between a locking position at which a pivotal motion of the pivot shaft is restricted by the locking portion and a pivotable position at which the pivot shaft is allowed to pivot.

In some embodiment, the restriction member may include a pair of contact walls that is formed in such a manner that a clearance therebetween is gradually widened toward a leading end of the restriction member. The restriction mechanism may further include a rotating mechanism that rotates the restriction member between a first position at which a pivotal motion of the pivot shaft is restricted by the contact walls within a first range, and a second position at which a pivotal motion of the pivot shaft is restricted by the contact walls within a second range that is wider than the first range. In addition, a buffer member may be attached to at least one of the contact wall, the locking portion, and the pivot shaft to absorb impact and noise resulting from a collision between the pivot shaft and the contact wall or the locking portion.

Thus, in the vehicle seat according to the embodiments of the present application, the pivot shaft and the reinforcement shaft are overlapped in a width direction of the vehicle at least partially. According to the embodiments of the present application, therefore, a thickness of a seatback may be reduced.

In addition, since a pivotal motion of the seat base frame is restricted by the restriction mechanism, a twisting motion of lumbosacral area of an occupant may be restricted so that the occupant is allowed to maintain a desirable posture during turning of the vehicle.

In addition, a pivotal motion of the seat base frame may be restricted by a simple mechanism to restrict a pivotal motion of the pivot shaft suspended from the second joint of the hub.

In addition, since the pivotal motion of the seat base frame may be selectively allowed and restricted by the restriction mechanism, the occupant is allowed to get into and get out of the vehicle easily.

In addition, a pivotal range of the seat base frame may be adjusted to a desirable range by the rotating mechanism in accordance with a vehicle speed, a physical constitution of the occupant and so on. Further impact and noise resulting from a collision between the pivot shaft and the restriction member may be absorbed by the buffer member.

BRIEF DESCRIPTION OF THE DRAWINGS

Features, aspects, and advantages of exemplary embodiments of the present disclosure will become understood with reference to the following description and accompanying drawings, which do not limit the disclosure in any way.

DETAILED DESCRIPTION OF SOME EMBODIMENTS

Figure 1:
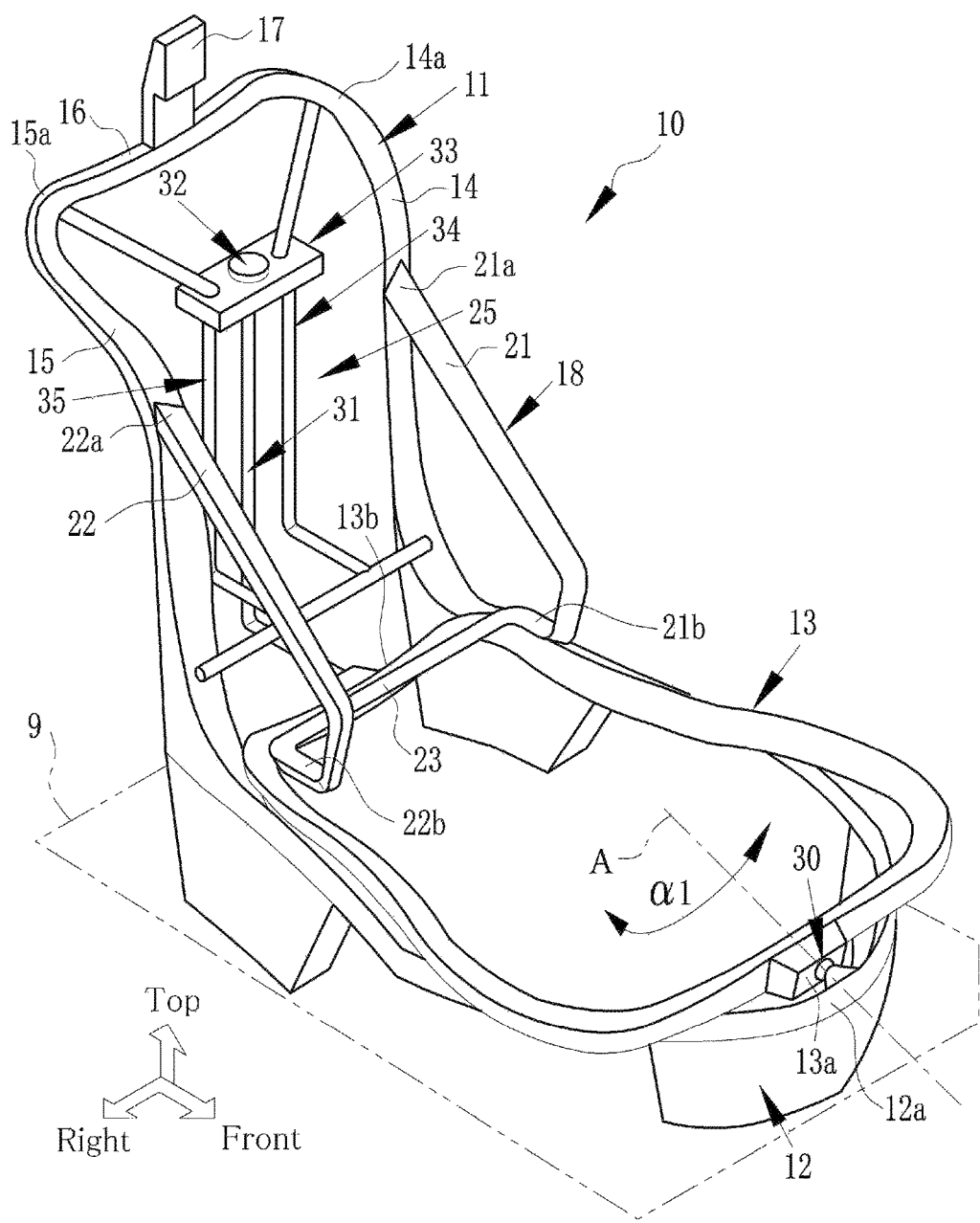
FIG. 1 is a perspective view showing the vehicle seat according to at least one embodiment of the present application.

Example embodiments of the present application will now be explained with reference to the accompanying drawings. Turning now to FIG. 1, there is shown a frame structure of a vehicle seat 10 according to at least one embodiment of the present application. As illustrated in FIG. 1, the vehicle seat 10 is disposed in a cabin 9, and contoured to hold one person. The vehicle seat 10 is used in some embodiments not only as a driver's seat but also as a passenger's seat, e.g., a front passenger seat.

A main frame of the vehicle seat 10 comprises a seatback frame 11 as an upper frame, and a pedestal frame 12 as a lower frame connected to the seatback frame 11. Specifically, the seatback frame 11 includes a left vertical portion 14, a right vertical portion 15, and an upper lateral portion 16 extending between an upper end 14a of the left vertical portion 14 and an upper end 15a of the right vertical portion 15. A headrest support 17 is attached to the upper lateral portion 16.

A sub-frame 18 for holding lumbosacral area of an occupant is suspended from the seatback frame 11 of the main frame while being allowed to swivel in accordance with a twisting motion of the occupant. Specifically, an upper end 21a of a left inclined portion 21 of the sub-frame 18 is connected to the left vertical portion 14 of the seatback frame 11 slightly above an intermediate portion through an elastic member (not shown), e.g., a blade spring, and an upper end 22a of a right inclined portion 22 of the sub-frame 18 is connected to the right vertical portion 15 of the seatback frame 11 slightly above an intermediate portion through the elastic member (not shown). Lower portions of the left inclined portion 21 and the right inclined portion 22 are bent downwardly while being withdrawn backwardly, and a lower lateral portion 23 as a reinforcement member extends between a lower end 21b of the left inclined portion 21 and a lower end 22b of the right inclined portion 22 to enhance torsional rigidity of the sub-frame 18.

The pedestal frame 12 extends frontward from a lower end of the seatback frame 11 substantially in parallel to a floor of the cabin 9. Optionally, the vehicle seat 10 may be mounted on a rail arranged on the floor of the cabin 9 so that a longitudinal position of the vehicle seat 10 is may be adjustable in a vehicle.

A seat base frame 13 is disposed on the pedestal frame 12 while being allowed to roll and yaw with the twisting motion of the occupant. Specifically, a front center 13a of the seat base frame 13 is connected to a front center 12a of the pedestal frame 12 through a first joint 30 such as a ball joint. On the other hand, a rear center 13b of the seat base frame 13 is connected to the seatback frame 11 through a supporting mechanism 25 including a pivot shaft 31 as a connection member, a second joint 32 as a ball joint, a hub 33, a first reinforcement shaft 34 and a second reinforcement shaft 35. According to at least one embodiment, therefore, the front part of the seat base frame 13 is allowed to pivot at least around a virtual axis A connecting the first joint 30 and the second joint 32 in a direction α1.

Figure 2:
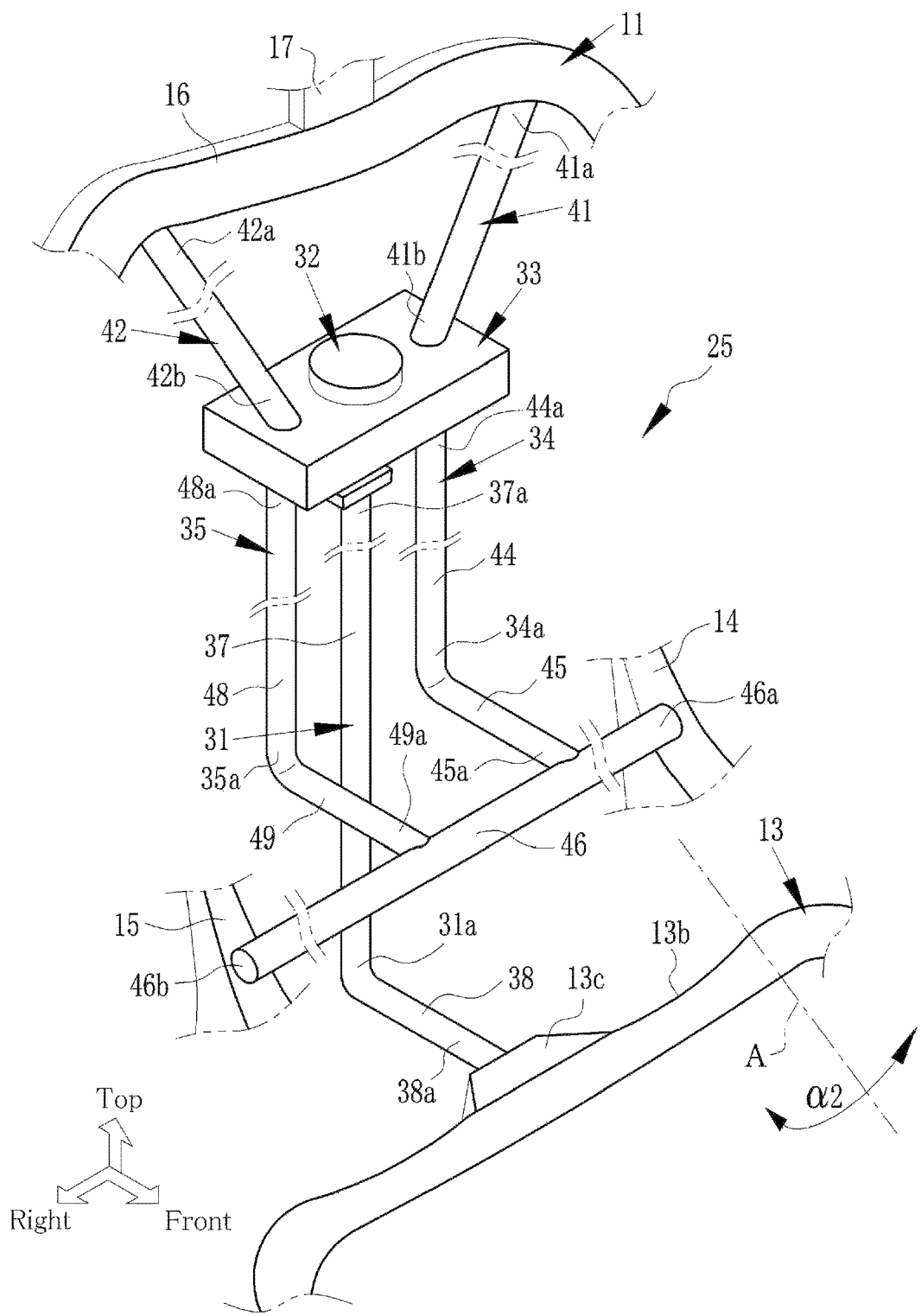
FIG. 2 is a perspective view showing a backrest support of the vehicle seat shown in FIG. 1.

Turning to FIG. 2, there is shown a structure of the supporting mechanism 25 in an enlarged scale. As illustrated in FIG. 2, the pivot shaft 31 is an L-shaped rod member including a vertical portion 37, and a longitudinal portion 38 extending from a bent portion 31a as a lower end of the vertical portion 37 toward the rear center 13b of the seat base frame 13. Specifically, an end portion 37a of the vertical portion 37 is connected to the hub 33 through the second joint 32, and an end portion 38a of the longitudinal portion 38 is connected to a connecting portion 13c formed on the rear center 13b of the seat base frame 13.

A cross-sectional shape of the pivot shaft 31 is not limited to a round shape, but a rod member having a polygonal shape may also be used as the pivot shaft 31. According to at least one embodiment, not only a hollow rod member but also a solid rod member may be used as the pivot shaft 31. In addition, a pair of rod members may also be used to serve as the pivot shaft 31. In this case, upper ends of the rod members are connected to the hub 33 through the ball joints, and lower ends of the rod members are connected to predetermined portions of the rear portion of the seat base frame 13 while keeping a predetermined clearance therebetween. Further, the lower end 37a of the vertical portion 37 may also be connected directly to the connecting portion 13c of the seat base frame 13 without forming the longitudinal portion 38.

As described, the second joint 32 as a ball joint is arranged in the hub 33, and the end portion 37a of the pivot shaft 31 is connected to the hub 33 through the second joint 32 in a pivotal manner. According to at least one embodiment, therefore, the pivot shaft 31 is allowed to pivot at least around the virtual axis A in a direction α2. Alternatively, a universal joint may also be used as the first joint 30 and the second joint 32 instead of the ball joint.

The hub 33 is suspended from the upper lateral portion 16 of the seatback frame 11 through a right diagonal shaft 42 and a left diagonal shaft 41. Specifically, an upper end 42*a* of the right diagonal shaft 42 is attached to a right corner of the seatback frame 11, and a lower end 42*b* of the right diagonal shaft 42 is attached to a right portion of an upper surface of the hub 33. Likewise, an upper end 41*a* of the left diagonal shaft 41 is attached to a left corner of the seatback frame 11, and a lower end 41*b* of the left diagonal shaft 41 is attached to a left portion of the upper surface of the hub 33. Alternatively, the hub 33 may be expanded in the lateral direction to be fixed to the right vertical portion 15 and the left vertical portion 14 of the seatback frame 11.

The first reinforcement shaft 34 situated in the left side of the pivot shaft 31 is also an L-shaped rod member including a vertical portion 44, and a longitudinal portion 45 extending from a bent portion 34*a* as a lower end of the vertical portion 44 toward a lateral shaft 46. Specifically, an end portion 44*a* of the vertical portion 44 is connected to the hub 33, and an end portion 45*a* of the longitudinal portion 45 is connected to the lateral shaft 46. The lateral shaft 46 also as a rod member extends laterally between the right vertical portion 15 and the left vertical portion 14 of the seatback frame 11, and a right end 46*b* is fixed to the right vertical portion 15 and a left end 46*a* is fixed to the left vertical portion 14. Alternatively, the lower end 34*a* of the vertical portion 44 may also be connected directly to the lateral shaft 46 without forming the longitudinal portion 45.

The second reinforcement shaft 35 situated in the right side of the pivot shaft 31 is also an L-shaped rod member including a vertical portion 48, and a longitudinal portion 49 extending from a bent portion 35*a* as a lower end of the vertical portion 48 toward the lateral shaft 46. Specifically, an end portion 48*a* of the vertical portion 48 is connected to the hub 33, and an end portion 49*a* of the longitudinal portion 49 is connected to the lateral shaft 46. Thus, the hub 33 is sustained by the first reinforcement shaft 34 and the second reinforcement shaft 35. According to at least one embodiment, a cross-sectional shape of each of the first reinforcement shaft 34 and the second reinforcement shaft 35 is not limited to a round shape, but a rod member having a polygonal shape may also be used as the pivot shaft 31. In addition, not only a hollow rod member but also a solid rod member may be used as the first reinforcement shaft 34 and the second reinforcement shaft 35.

Figure 3:
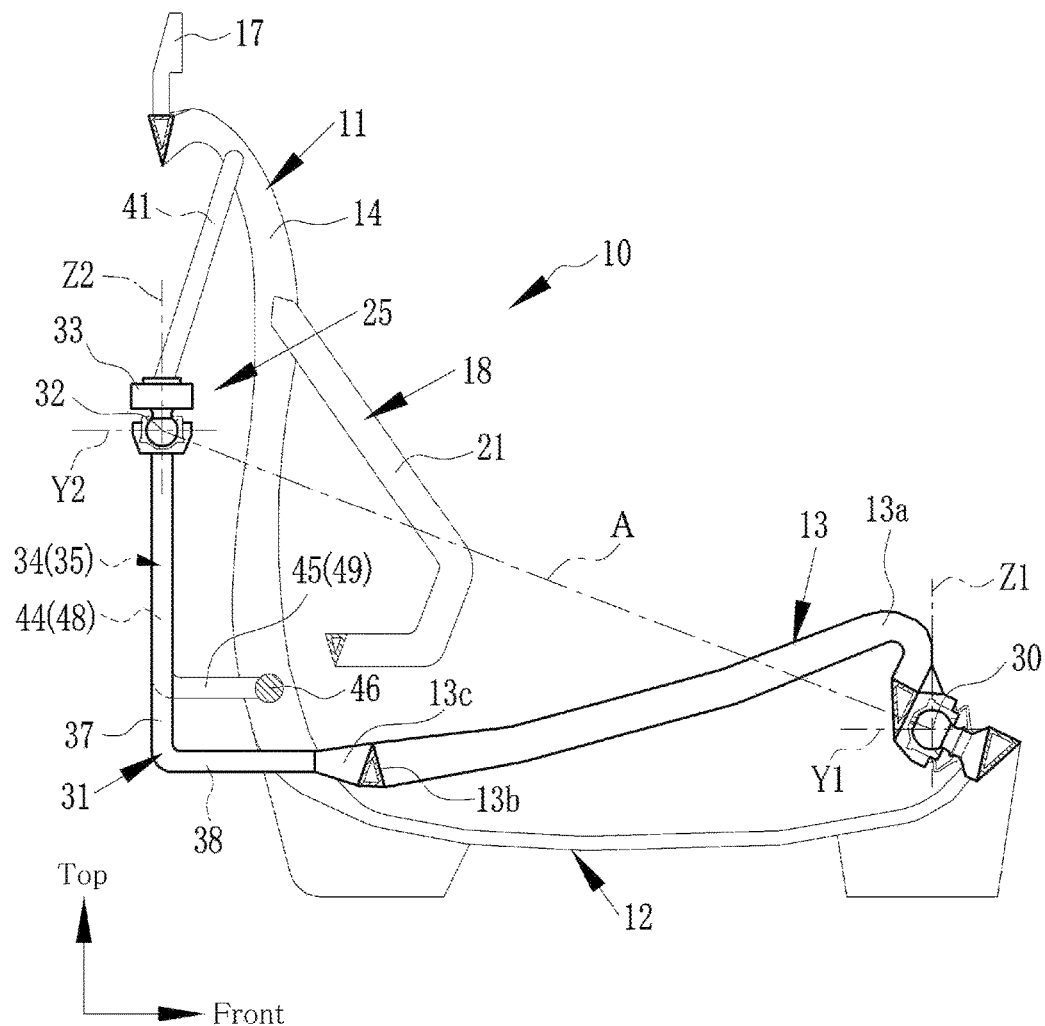
FIG. 3 is a cross-sectional view showing a longitudinal cross-section of the vehicle seat shown in the vehicle in FIG. 1.

Turning to FIG. 3, there is shown a cross-section of the vehicle seat 10 in the longitudinal direction. As shown in FIG. 3, the vertical portion 44 of the first reinforcement shaft 34, the vertical portion 37 of the pivot shaft 31, and the vertical portion 48 of the second reinforcement shaft 35 are aligned in a width direction of the vehicle. That is, the first reinforcement shaft 34, the pivot shaft 31 and the second reinforcement shaft 35 are overlapped in the width direction of the vehicle at least partially. Optionally, the vertical portion 44 of the first reinforcement shaft 34 and the vertical portion 48 of the second reinforcement shaft 35 may be inclined slightly in the longitudinal direction of the vehicle. According of at least one embodiment, therefore, a thickness of the seatback including the seatback frame 11 may be reduced.

The virtual axis A extends between the first joint 30 and the second joint 32 while passing through the lumbosacral area of the occupant. Preferably, an inclination of the virtual axis A is set to 60 degrees, and may be adjusted within a range between 45 degrees and 75 degrees.

During turning of the vehicle, the front center 13*a* of the seat base frame 13 connected to the pedestal frame 12 through the first joint 30 pivots not only around a longitudinal axis Y1 of the first joint 30 but also around a vertical axis Z1 of the first joint 30. Likewise, the pivot shaft 31 connected to the seatback frame 11 through the second joint 32 pivots not only around a longitudinal axis Y2 of the second joint 32 but also around a vertical axis Z2 of the second joint 32.

For this reason, the front part of the seat base frame 13 is allowed to roll around the axis Y1 and the rear part of the seat base frame 13 is allowed to sway in the lateral direction during turning with a twisting motion of the upper body and a swiveling motion of lumbosacral area of the occupant.

Figure 4:
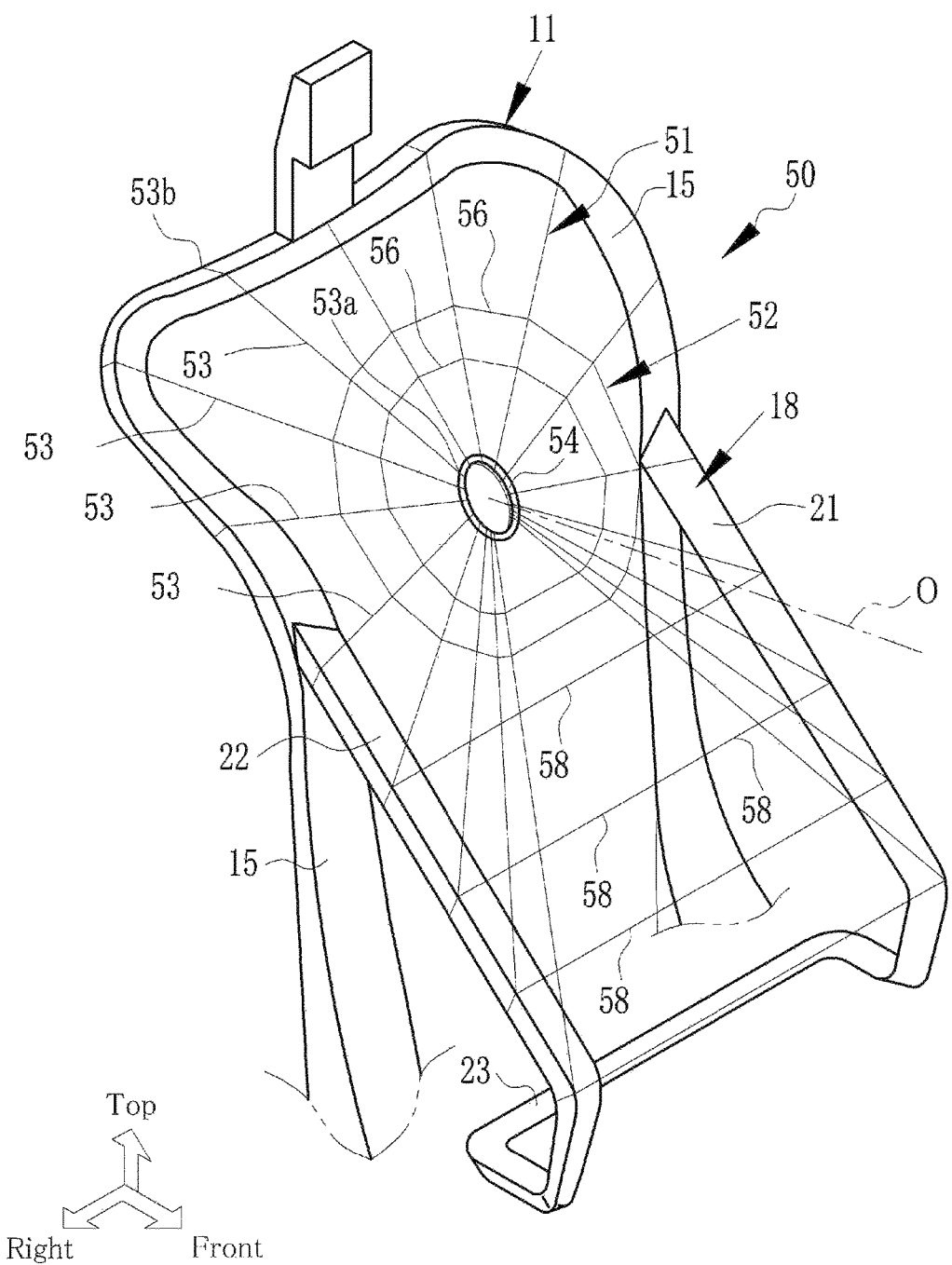
FIG. 4 is a perspective view showing one example of a backrest.

Turning to FIG. 4, there is shown a perspective view of a seatback according to at least one example. In a seatback 50, a backrest 52 comprises a first net 51 attached to an upper portion of the seatback frame 11 and the sub-frame 18. The first net 51 includes: a hub ring 54 situated at a point corresponding to the spine of the occupant between shoulder blades; a plurality of first strings 53 drawn radially around the hub ring 54; a plurality of second strings 56 arranged around the hub ring 54 in a circular manner; and a plurality of third strings 58 extending laterally between the right inclined portion 22 and the left inclined portion 21 of the sub-frame 18. Specifically, the hub ring 54 is situated at a point slightly above a height center of the seatback frame 11 in a width center of the seatback frame 11. Radially outer ends 53*b* of some of the first strings 53 are attached to the upper portion of the seatback frame 11, and radially inner ends 53*a* of those first strings 53 are attached to the hub ring 54. Radially outer ends 53*b* of remaining first strings 53 are attached to the right inclined portion 22 and the left inclined portion 21 of the sub-frame 18, and radially inner ends 53*a* of those first strings 53 are attached to the hub ring 54. That is, the sub-frame 18 is joined to the seatback frame 11 of the main frame also through the first net 51 while being allowed to swivel in accordance with a twisting motion of the occupant. The second strings 56 and the third strings 58 may be omitted depending on a structure of the main frame.

The first strings 53, the second strings 56 and the third strings 58 are formed of elastic string materials individually having a round cross-section so that the first net 51 may be stretched by the perpendicular load applied from the occupant's back. Materials, diameters, configurations and lengths etc. of the string materials may be altered to achieve a required tensile strength of the first net 51. In addition, numbers of the first strings 53, the second strings 56 and the third strings 58 may also be altered according to need.

As a bucket seat or a semi-bucket seat, the backrest 52 is contoured in such a manner as to hold especially an upper body of the occupant tightly while allowing the occupant to move flexibly when, e.g., subjected to lateral acceleration during turning. In order to allow the first net 51 to be deformed easily with the twisting motion of the occupant around an axis O longitudinally passing though a center of the hub ring 54, lengthwise stiffness of the first strings 53 may be increased while reducing bending strength of the first strings 53. Consequently, the occupant is allowed to twist his/her upper body when subjected e.g., to the lateral acceleration during turning.

In order to hold the upper body of the occupant between the lumbosacral area and shoulder tightly but comfortably, the backrest 52 is contoured along the spine of the occupant as illustrated in FIG. 3. In addition, the sub-frame 18 is inclined in such a manner that the lower portion thereof protrudes frontward so that a longitudinal position of the lumbosacral area of the occupant is situated slightly in front of that of the shoulder.

Given that the vehicle seat 10 is used as the driver's seat, when a driver sitting on the vehicle seat 10 according to the embodiments turns a steering wheel of the vehicle, one of his/her arm is moved to an upper region of the steering wheel, and the other arm is moved to a lower region of the steering wheel. Consequently, one of his/her shoulders is moved upwardly and the other shoulder is moved downwardly. As described, the first net 51 is adapted to be deformed in a rotational direction around the hub ring 54 so that the driver is allowed to move his/her shoulders easily.

Figure 5:
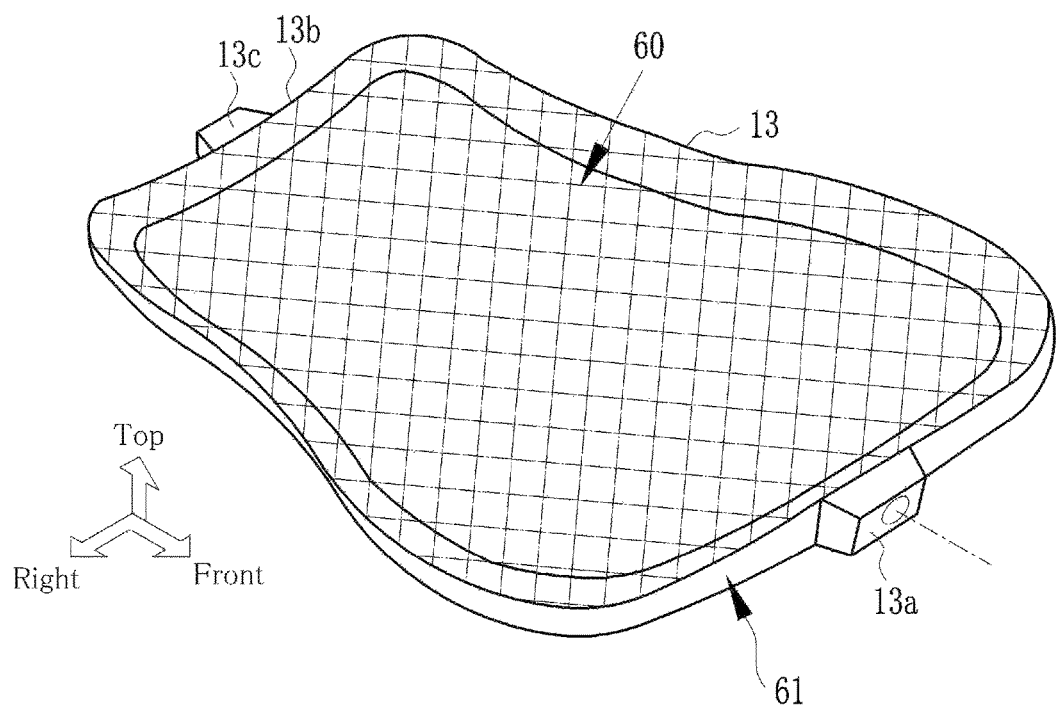
FIG. 5 is a perspective view showing one example of a seat base.

FIG. 5 is a perspective view showing a second net 60 attached to the seat base frame 13 to form a seat base 61 for holding the occupant's hips and thighs. For example, the second net 60 may be made of thermoplastic resin to ensure elasticity of the seat base 61. The second net 60 is formed into a predetermined pattern in such a manner as to disperse load applied to the seat base 61 from the occupant.

Figure 6:
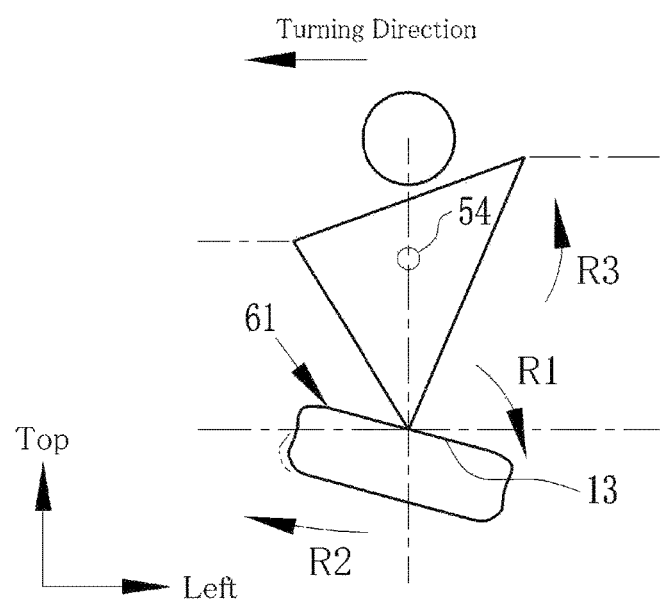
FIG. 6 is a schematic illustration showing a pivotal motion of the seat base during turning.

FIG. 6 is a schematic illustration showing a posture of the driver and the pivotal motion of the seat base 61. For example, when the driver rotates the steering wheel in the direction to turn the vehicle to the right, the left shoulder of the driver is moved upwardly and the right shoulder is moved downwardly. Consequently, the front part of the seat base frame 13 is rolled around the front center 13a in the rolling direction R1 (i.e., counterclockwise) and the rear part of the seat base frame 13 is swayed in the swaying direction R2 (i.e., to the right side) by the twisting motion of lumbosacral area of the driver. Thus, the supporting mechanism 25 according to the embodiments allows the seat base frame 13 to roll in the opposite direction to the rotational direction R3 of the driver's shoulders. For this reason, the driver is allowed to turn the steering wheel easily with no sense of fatigue.

Figure 7:
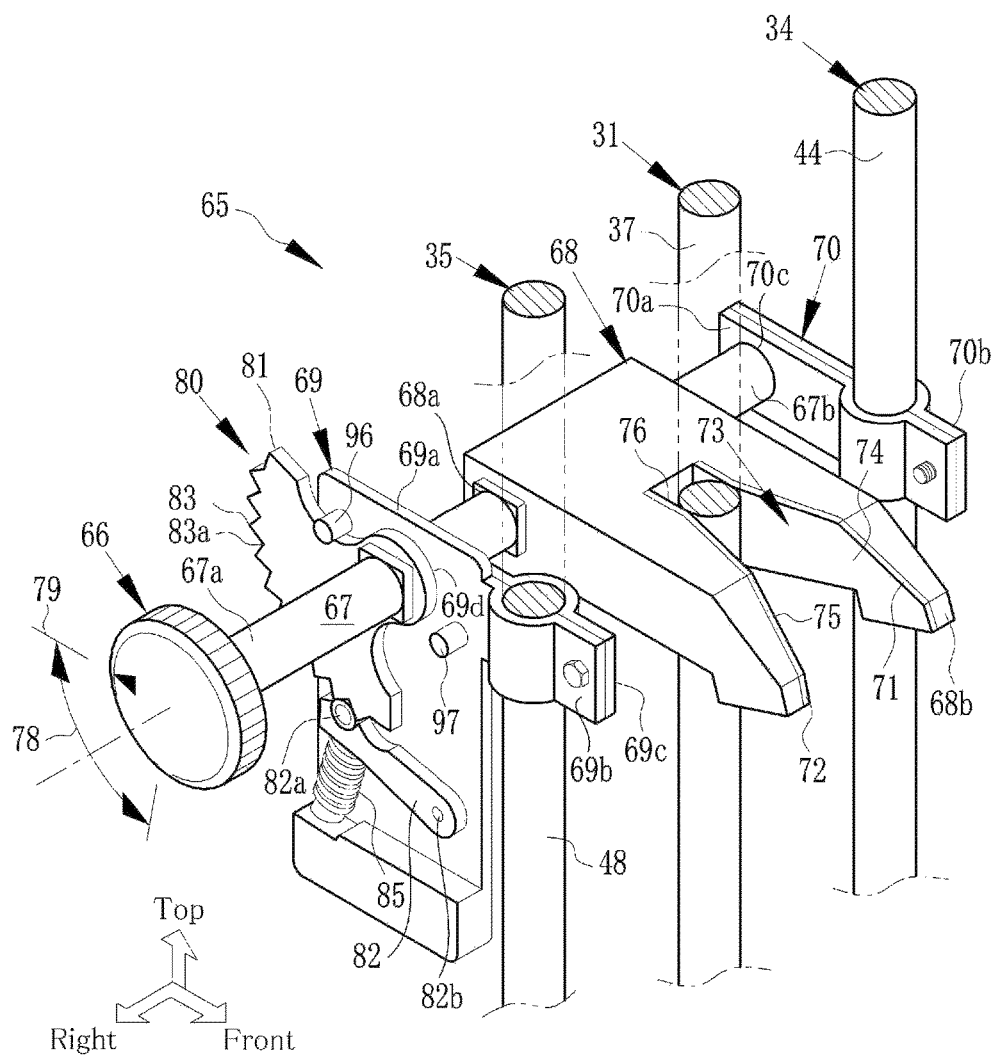
FIG. 7 is a partial perspective view showing one example a restriction mechanism.

FIG. 7 is a perspective view showing a structure of a restriction mechanism 65 for restricting a movement of the pivot shaft 31. The restriction mechanism 65 comprises a knob 66, a rotary shaft 67, a restriction member 68, a first supporting member 69 and a second supporting member 70. The first supporting member 69 includes a main plate 69a, a first clamping member 69b connected to one end of the main plate 69a, a second clamping member 69c coupled to the first clamping member 69b and a though hole 69d. The second supporting member 70 includes a first clamping member 70a, a second clamping member 70b coupled to the first clamping member 70a and a though hole 70c. Specifically, the first supporting member 69 is fixed to the vertical portion 48 of the second reinforcement shaft 35 by clamping the vertical portion 48 by the first clamping member 69b and the second clamping member 69c. Likewise, the second supporting member 70 is fixed to the vertical portion 44 of the first reinforcement shaft 34 by clamping the vertical portion 44 the first clamping member 70a and the second clamping member 70b.

The restriction member 68 is situated between the first supporting member 69 and the second supporting member 70, and the rotary shaft 67 is inserted into the though hole 69d of the first supporting member 69, a through hole 68a formed in a rear end of the restriction member 68 and the though hole 70c of the second supporting member 70. In the though hole 69d of the first supporting member 69 and the though hole 70c of the second supporting member 70, the rotary shaft 67 is allowed to rotate freely. By contrast, an outer circumferential face of the rotary shaft 67 is fixed to an inner circumferential face of the through hole 68a of the restriction member 68. A groove 73 is formed in a front part of the restriction member 68 for holding the vertical portion 37 of the pivot shaft 31 therein. The groove 73 includes a pair of contact walls 74 and 75, and a clearance between the contact walls 74 and 75 is gradually widened toward a leading end 68b of the restriction member 68. In the groove 73 of the restriction member 68, therefore, a range of motion of the pivot shaft 31 is restricted within the clearance between the contact walls 74 and 75. In addition, a locking portion 76 at which the clearance between the contact walls 74 and 75 is narrowest is formed between base ends of the contact walls 74 and 75, and when the pivot shaft 31 is held in the locking portion 76, the pivotal motion of the pivot shaft 31 in the width direction of the vehicle is restricted.

The knob 66 as a dial member is attached to one end of the rotary shaft 67, and the rotary shaft 67 is rotated by rotating the knob 66 within a rotational range 78 of the knob 66. Specifically, when the knob 66 is rotated to a locking position 79 at one end of the rotational range 78, the restriction member 68 is rotated together with the rotary shaft 67 to a position substantially parallel to the floor of the cabin 9 so that the pivot shaft 31 is held in the locking portion 76.

In order to absorb impact and noise resulting from a collision between the pivot shaft 31 and the contact walls 74 and 75, a buffer member 71 is attached to the contact wall 74 and a side wall of the locking portion 76, and a buffer member 72 is attached to the contact wall 75 and other side wall of the locking portion 76. The buffer member may also be attached to the outer circumferential face of the pivot shaft 31, or attached only to the outer circumferential face of the pivot shaft 31.

The restriction mechanism 65 further comprises an angle holding mechanism 80 that holds a rotational angle of the restriction member 68. The angle holding mechanism 80 comprises a gear segment 81, a lever 82 having a ball 82a and a pin 82b, and an elastic member 85. Specifically, the gear segment 81 is fitted onto the rotary shaft 67 at a position adjacent to a face of the main plate 69a of the first supporting member 69 facing to the knob 66 in such a manner as to be rotated integrally with the rotary shaft 67, and gear teeth 83 are formed on a circumference. A base end of the lever 82 is supported by the pin 82b in a pivotal manner while pushing a leading end at which the ball 82c is attached upwardly by the elastic member 85. The ball 82a is pushed into one of notches 83a between the gear teeth 83 to hold the rotational angle of the restriction member 68 at a predetermined angle, and the ball 82a is moved to the adjacent notch 83a when a rotating force applied to the knob 66 overwhelms a pushing force of the elastic member 85 thereby changing the rotational angle of the restriction member 68. In order to define the rotational range 78 of the restriction member 68 within a range possible to selectively allow and restrict the pivotal motion of the pivot shaft 31 in the width direction of the vehicle, a rotational range of the gear segment 81 is restricted by a pair of stoppers 96 and 97.

Figure 8:
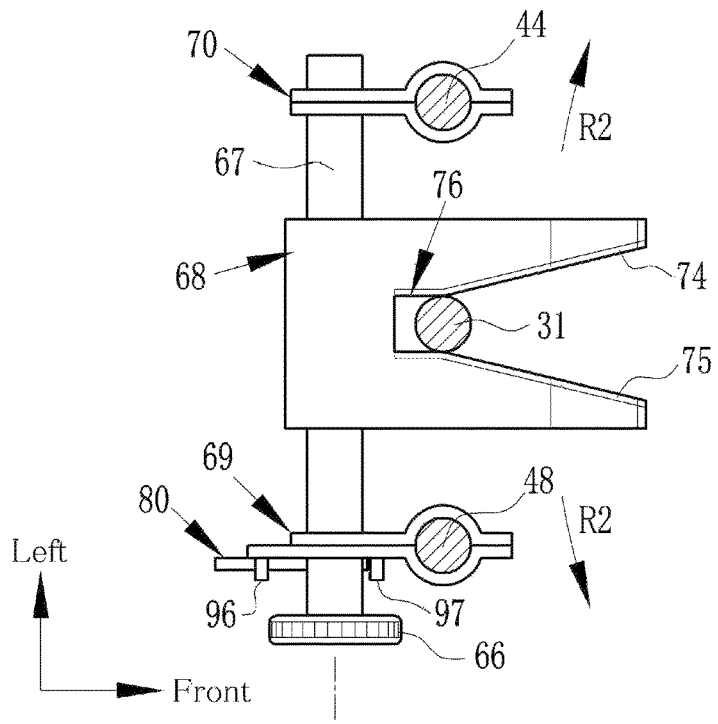
FIG. 8 is a top view showing the restriction mechanism in a locking position.

FIG. 8 shows a top view of the restriction member 68 when the knob 66 is rotated to the locking position 79. In this situation, the restriction member 68 is turned to the position at which the pivot shaft 31 is held in the locking portion 76. Consequently, pivotal motion of the pivot shaft 31 in the swaying direction R2 is restricted by the side walls of the locking portion 76 from both sides.

Figure 9:
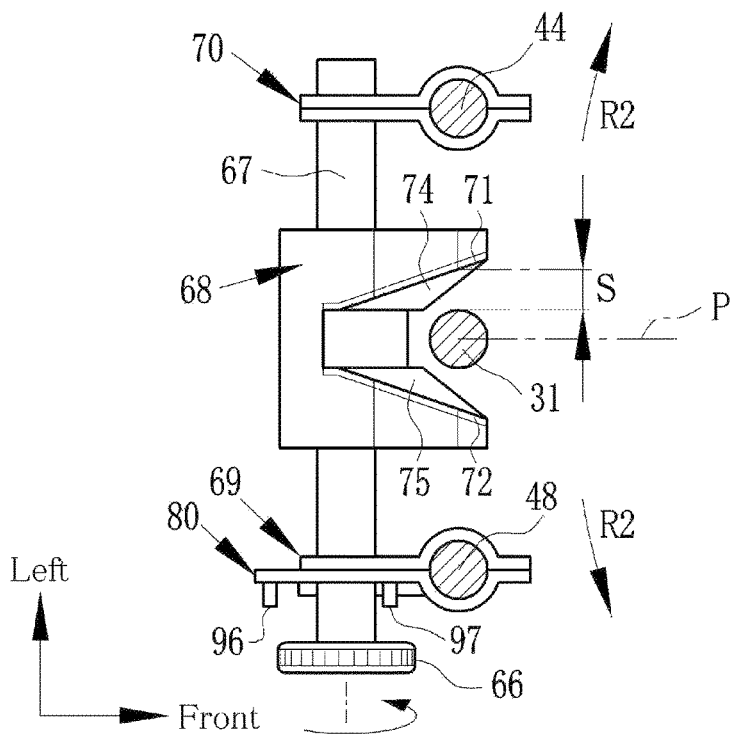
FIG. 9 is a top view showing a regulation structure is operated to adjust a first movable shaft by a operation portion.

FIG. 9 shows a top view of the restriction member 68 when the knob 66 is rotated from the locking position 79. For example, given that the restriction member 68 is in a first position in which a clearance S between the pivot shaft 31 and the contact wall 74 or 75 is a predetermined value, the restriction member 68 is turned to a second position in which the clearance S is wider than that in the first position by rotating the knob 66 counterclockwise. In this situation, a pivotal range of the pivot shaft 31 in the swaying direction R2 is restricted by the contact walls 74 and 75 of the restriction member 68. Specifically, when the restriction member 68 is in the first position, the pivotal range of the pivot shaft 31 in the swaying direction R2 is restricted within a first range by the contact walls 74 and 75. Then, when the restriction member 68 is turned to the second position, the pivotal range of the pivot shaft 31 in the swaying direction R2 is restricted within a second range that is wider than the first range. In the embodiments, it is preferable to restrict the pivotal range of the pivot shaft 31 in the swaying direction R2 within 5 degrees from a width center P of the vehicle seat 10. Thus, the knob 66 and the rotary shaft 67 serve as a rotating mechanism for rotating the restriction member 68 between the locking position at which a pivotal motion of the pivot shaft 31 is restricted by the locking portion 76 and a pivotable position at which the pivot shaft 31 is allowed to pivot in the swaying direction R2.

Optionally, in order to selectively restrict a pivotal motion of the pivot shaft 31, a restriction member in which only the locking portion 76 is formed in the groove 73, and another locking portion in which only the contact walls 74 and 75 are formed in the groove 73 may be arranged vertically coaxially.

Figure 10:
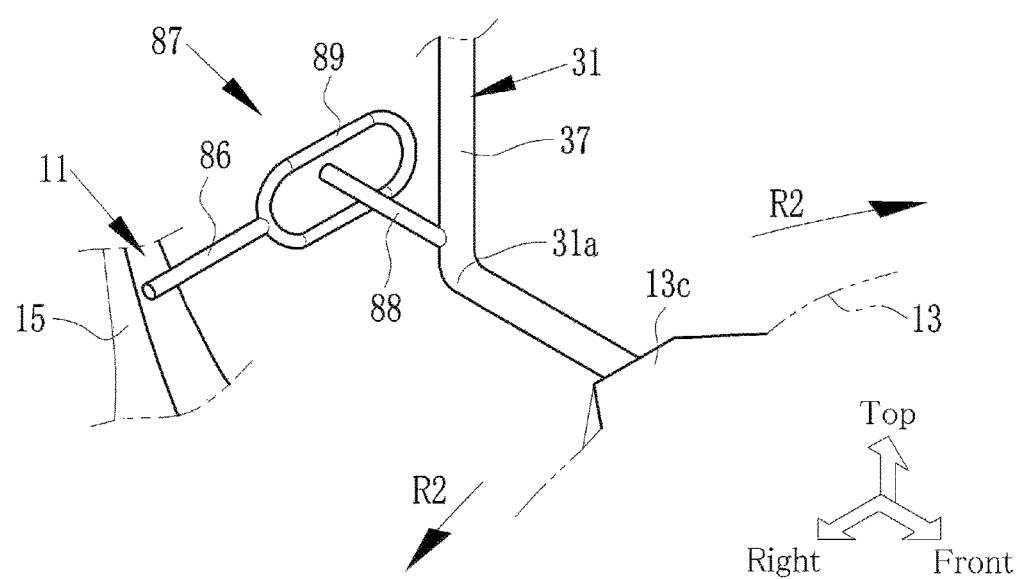
FIG. 10 is a perspective view showing the regulation structure of the vehicle seat according to another embodiment of the present application.

FIG. 10 shows another embodiment of the restriction mechanism. According to another embodiment, a restriction mechanism 87 comprises an oval ring member 89 attached to the right vertical portion 15 of the seatback frame 11 through an arm 86, and a restriction rod 88 extending longitudinally backwardly from the bent portion 31a of the pivot shaft 31 to be inserted into the ring member 89. Thus, according to another embodiment, the pivotal range of the pivot shaft 31 in the swaying direction R2 is restricted within a width of the ring member 89. In FIG. 10, although the ring member 89 is attached to the right vertical portion 15 of the seatback frame 11, the ring member 89 may also be attached to the rear end of the pedestal frame 12 through a pair of arms extending from both sides of the ring member 89 toward each corner between the seatback frame 11 and the pedestal frame 12. In this case, the restriction rod 88 may extend upwardly from the longitudinal portion 38 of the pivot shaft 31. The oval ring member 89 may also be attached to the bent portion 31a of the pivot shaft 31 through an arm. In this case, an L-shaped restriction rod may be attached to any one of the vertical portions 14 and 15 of the seatback frame 11. In addition, a plate member having a longitudinal guide groove or hole may also be used instead of the ring member 89. Optionally, buffer members may be attached to the oval ring member 89 and the restriction rod 88.

Further, the restriction mechanisms 65 and 87 may also be adapted to restrict the pivotal motion of the pivot shaft 31 in the swaying direction R2 indirectly utilizing other members.

Figure 11:
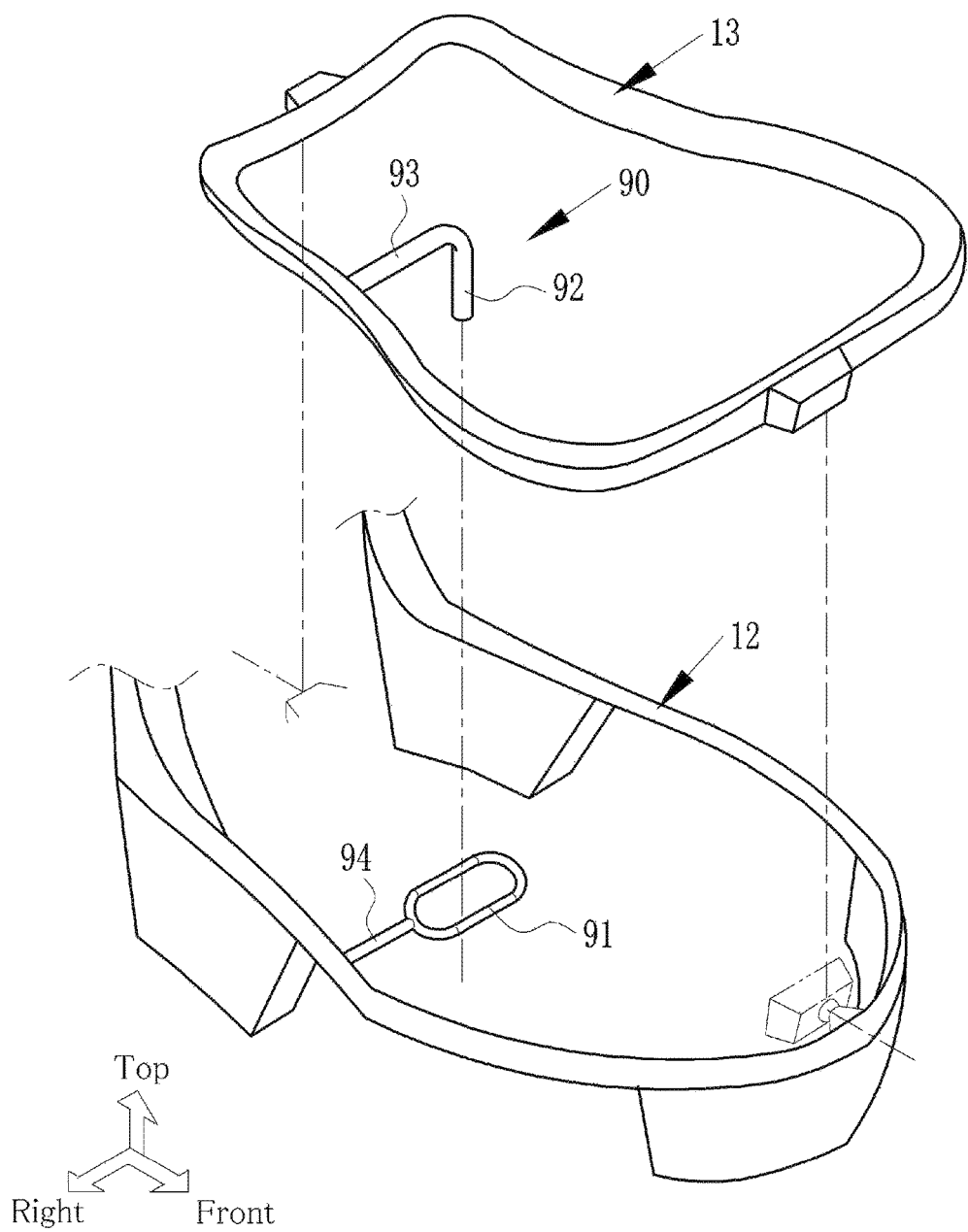
FIG. 11 is a perspective view showing the regulation structure of the vehicle seat according to still another embodiment of the present application.

FIG. 11 is a perspective view showing still another embodiment of the restriction mechanism. According to another embodiment, a restriction mechanism 90 comprises an oval ring member 91 attached to an intermediate portion of one of side portions of the pedestal frame 12 through an arm 94, and an L-shaped restriction rod 93 extending laterally from an intermediate portion of side portion of the seat base frame 13 in the same side. A leading end portion 92 of the restriction rod 93 is bent downwardly to be inserted into the ring member 91. In this case, buffer members may also be attached to the oval ring member 91 and the restriction rod 93. Alternatively, the oval ring member 91 may also be attached to the intermediate portion of one of the side portions of the seat base frame 13 through the arm 94, and the restriction rod 93 may also extend laterally from the intermediate portion of the side portion of the pedestal frame 12 in the same side. In this case, the leading end portion 92 of the restriction rod 93 may be bent upwardly to be inserted into the ring member 91.

Optionally, a recliner mechanism (not shown) may be employed in the vehicle seat 10 shown in FIG. 1. To this end, a pivotal joint may be arranged in the end portion 38a of the longitudinal portion 38 of the pivot shaft 31 to allow the pivot shaft 31 to recline longitudinally backwardly.

Figure 12:
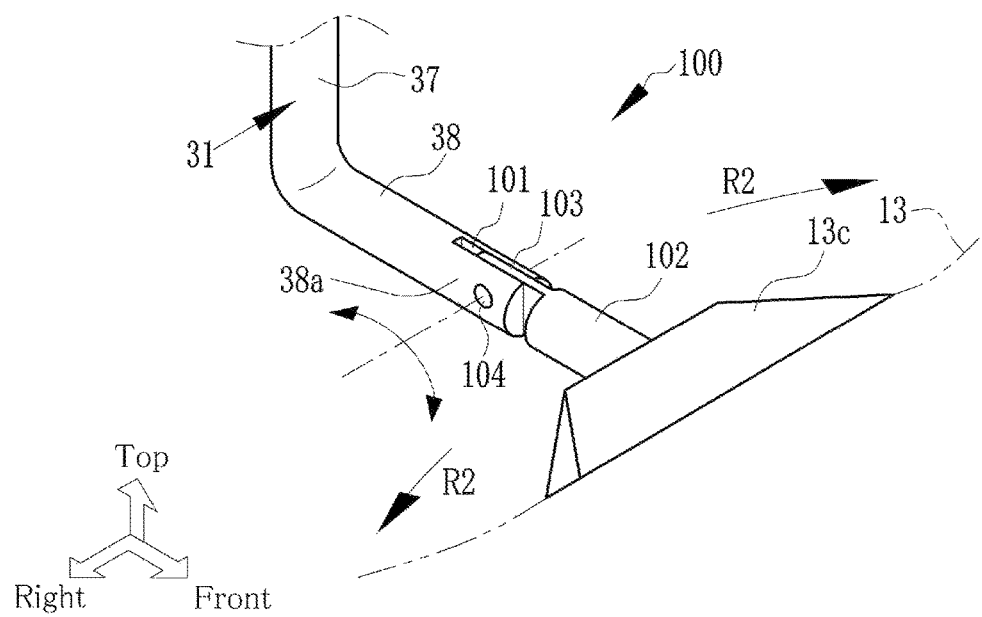
FIG. 12 is a perspective view showing a movable shaft and seat base frame connected to rotate relatively.

FIG. 12 is a perspective view showing one example of the pivotal joint. A pivotal joint 100 comprises a vertical groove 101 formed in the end portion 38a of the longitudinal portion 38 of the pivot shaft 31, a connection shaft 102 extending from the connecting portion 13c of the seat base frame 13, and a vertical plate 103 extending from a leading end of the connection shaft 102. The vertical plate 103 is inserted into the vertical groove 101, and a pin 104 penetrates laterally though the end portion 38a and the vertical plate 103 in the vertical groove 101. When the seatback frame 11 is reclined, therefore, the pivot shaft 31 is allowed to be reclined longitudinally together with the first reinforcement shaft 34 and the second reinforcement shaft 35, but restricted to pivot in the in the swaying direction R2. Even when the pivot shaft 31 is thus inclined, the first reinforcement shaft 34, the pivot shaft 31 and the second reinforcement shaft 35 are still overlapped in the width direction of the vehicle at least partially.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A vehicle seat, comprising:
   a lower frame that is disposed in a cabin of a vehicle;
   an upper frame connected to the lower frame on which a backrest is formed;
   a seat base frame disposed on the lower frame on which a seat base is formed;
   a supporting mechanism that supports the seat base frame in a pivotal manner; and
   a first joint that connects a front end portion of the seat base frame to the lower frame in a pivotal manner,
   wherein the supporting mechanism comprises
      a pivot shaft in which one of end portions thereof is connected to a rear end portion of the seat base frame,
      a hub member that is situated within the upper frame while being connected to the upper frame,
      a second joint that connects other end portion of the pivot shaft to the hub, and a reinforcement shaft in which one of end portions is connected to the hub member, and other end portion is connected to the upper frame or the lower frame; and wherein the pivot shaft and the reinforcement shaft are overlapped in a width direction of the vehicle at least partially.

2. The vehicle seat as claimed in claim 1, further comprising:
a restriction mechanism that restricts a pivotal motion of the seat base frame.

3. The vehicle seat as claimed in claim 2, wherein the restriction mechanism includes a restriction member that selectively allows and restricts a pivotal motion of the pivot shaft from both sides of the pivot shaft.

4. The vehicle seat as claimed in claim 2, wherein
the restriction mechanism includes a restriction member that selectively allows and restricts a pivotal motion of the pivot shaft from both sides of the pivot shaft,
the restriction member includes a locking portion at which a pivotal motion of the pivot shaft is restricted,
the restriction mechanism further includes a rotating mechanism that rotates the restriction member between a locking position at which a pivotal motion of the pivot shaft is restricted by the locking portion and a pivotable position at which the pivot shaft is allowed to pivot.

5. The vehicle seat as claimed in claim 2, wherein
the restriction mechanism includes a restriction member that selectively allows and restricts a pivotal motion of the pivot shaft from both sides of the pivot shaft;
the restriction member includes a pair of contact walls that is formed in such a manner that a clearance therebetween is gradually widened toward a leading end of the restriction member, and
the restriction mechanism further includes a rotating mechanism that rotates the restriction member between a first position at which a pivotal motion of the pivot shaft is restricted by the contact walls within a first range, and a second position at which a pivotal motion of the pivot shaft is restricted by the contact walls within a second range that is wider than the first range.

6. The vehicle seat as claimed in claim 3, wherein
the restriction member includes a locking portion at which a pivotal motion of the pivot shaft is restricted,
the restriction mechanism further includes a rotating mechanism that rotates the restriction member between a locking position at which a pivotal motion of the pivot shaft is restricted by the locking portion and a pivotable position at which the pivot shaft is allowed to pivot.

7. The vehicle seat as claimed in claim 3, wherein
the restriction member includes a pair of contact walls that is formed in such a manner that a clearance therebetween is gradually widened toward a leading end of the restriction member, and
the restriction mechanism further includes a rotating mechanism that rotates the restriction member between a first position at which a pivotal motion of the pivot shaft is restricted by the contact walls within a first range, and a second position at which a pivotal motion of the pivot shaft is restricted by the contact walls within a second range that is wider than the first range.

8. The vehicle seat as claimed in claim 2, wherein the restriction mechanism further includes a buffer member that is attached to at least one of the contact wall, the locking portion, and the pivot shaft to absorb impact and noise resulting from a collision between the pivot shaft and the contact wall or the locking portion.

9. The vehicle seat as claimed in claim 3, wherein the restriction mechanism further includes a buffer member that is attached to at least one of the contact wall, the locking portion, and the pivot shaft to absorb impact and noise resulting from a collision between the pivot shaft and the contact wall or the locking portion.

10. The vehicle seat as claimed in claim 4, wherein the restriction mechanism further includes a buffer member that is attached to at least one of the contact wall, the locking portion, and the pivot shaft to absorb impact and noise resulting from a collision between the pivot shaft and the contact wall or the locking portion.

11. The vehicle seat as claimed in claim 5, wherein the restriction mechanism further includes a buffer member that is attached to at least one of the contact wall, the locking portion, and the pivot shaft to absorb impact and noise resulting from a collision between the pivot shaft and the contact wall or the locking portion.

12. The vehicle seat as claimed in claim 6, wherein the restriction mechanism further includes a buffer member that is attached to at least one of the contact wall, the locking portion, and the pivot shaft to absorb impact and noise resulting from a collision between the pivot shaft and the contact wall or the locking portion.

13. The vehicle seat as claimed in claim 7, wherein the restriction mechanism further includes a buffer member that is attached to at least one of the contact wall, the locking portion, and the pivot shaft to absorb impact and noise resulting from a collision between the pivot shaft and the contact wall or the locking portion.

* * * * *